(12) United States Patent
Wood et al.

(10) Patent No.: US 8,646,105 B2
(45) Date of Patent: Feb. 4, 2014

(54) SYSTEM, METHOD AND SECURITY DEVICE FOR AUTHORIZING USE OF A SOFTWARE TOOL

(75) Inventors: Robert H. Wood, Waterloo (CA); Sye van der Veen, Kitchener (CA); Thomas Nagy, Waterloo (CA); Atul Asthana, Unionville (CA)

(73) Assignee: BlackBerry Limited, Waterloo, Ontario (CA)

(*) Notice: Subject to any disclaimer, the term of this patent is extended or adjusted under 35 U.S.C. 154(b) by 1307 days.

(21) Appl. No.: 12/200,990

(22) Filed: Aug. 29, 2008

(65) Prior Publication Data

US 2010/0058053 A1 Mar. 4, 2010

(51) Int. Cl.
*G06F 21/00* (2013.01)
*H04L 9/32* (2006.01)
*G06F 12/14* (2006.01)

(52) U.S. Cl.
USPC ............... 726/30; 726/29; 726/20; 713/185; 713/176

(58) Field of Classification Search
USPC ............ 726/29, 30, 27, 26, 20, 17; 713/185, 713/176, 168; 705/51
See application file for complete search history.

(56) References Cited

U.S. PATENT DOCUMENTS

| | | | | |
|---|---|---|---|---|
| 5,661,807 | A * | 8/1997 | Guski et al. | 713/159 |
| 5,943,423 | A * | 8/1999 | Muftic | 705/67 |
| 6,490,443 | B1 * | 12/2002 | Freeny, Jr. | 455/406 |
| 7,281,132 | B2 * | 10/2007 | Bender et al. | 713/172 |
| 7,404,007 | B2 * | 7/2008 | Wilcock et al. | 709/238 |
| 7,502,941 | B2 * | 3/2009 | Michael et al. | 713/189 |
| 2001/0044777 | A1 * | 11/2001 | Haley et al. | 705/43 |
| 2002/0125886 | A1 * | 9/2002 | Bates et al. | 324/307 |
| 2003/0061166 | A1 | 3/2003 | Saito et al. | |
| 2004/0148502 | A1 | 7/2004 | Gollner et al. | |
| 2006/0176884 | A1 * | 8/2006 | Fair et al. | 370/400 |
| 2006/0179433 | A1 * | 8/2006 | Fair et al. | 717/174 |
| 2009/0312093 | A1 * | 12/2009 | Walker et al. | 463/25 |

FOREIGN PATENT DOCUMENTS

| | | |
|---|---|---|
| EP | 0997808 | 5/2000 |
| EP | 1022638 | 7/2000 |
| GB | 2403314 | 12/2004 |

OTHER PUBLICATIONS

Menezes et al. Handbook of Applied Cryptography. CRC Press, 1997. pp. 397-405.*
Schneier, B. Applied Cryptography, Second Edition: Protocols, Algorithms, and Source Code in C. John Wiley & Sons, 1996. pp. 31-34.*

(Continued)

*Primary Examiner* — Zachary A Davis
(74) *Attorney, Agent, or Firm* — Bereskin & Parr LLP/S.E.N.C.R.L. s.r.l.

(57) ABSTRACT

The described embodiments relate generally to methods, systems and security devices for authorizing use of a software tool. Certain embodiments of the invention relate to a security device. The security device comprises at least one communication subsystem for enabling communication between the security device and a first external device, wherein the first external device has a software tool executable on the first external device. The security device further comprises a memory and processor coupled to the at least one communication subsystem and configured to control the at least one communication subsystem. The memory is accessible to the processor and stores a key for authorizing use of the software tool. The memory further stores program instructions which, when executed by the processor, cause the processor to execute a security application.

13 Claims, 5 Drawing Sheets

(56) References Cited

OTHER PUBLICATIONS

European Examination Report dated Dec. 6, 2010, European Patent Application No. 08163224.2.
Extended European search report dated Feb. 13, 2009, European Patent Application No. 08163224.2.
"Sentinel Hardware Keys: The Most Secure Hardware Token in the World", www.safenet-inc.com/Library/3/sentinelhardwarekeys.pdf, date retrieved from internet: Sep. 25, 2007.
"Sentinel Hardware Key DRM Solutions", www.safenet-inc.com/products/sentinel/hardware_keys.asp, date retrieved from internet: Sep. 25, 2007.
"Curtailing the Piracy Epidemic: A Case for Hardware Security Keys", www.safenet-Inc.com/Library/8/security_keys_roi.pdf, pp. 1-7, date retrieved from internet: Sep. 25, 2007.
"Keylok Dongle Features", www.keylok.com/solution/keylokdonglefeatures.aspx, pp. 1-2, date retrieved from internet: Sep. 25, 2007.
"Hardware Key Security for Your Software Applications", www.keylok.com/product/, pp. 1-6, date retrieved from Internet: Sep. 25, 2007.
Response to European Search Report dated Aug. 25, 2009, European Patent Application No. 08163224.2.
Communication pursuant to Rule 71(3) dated Apr. 11, 2012, European Patent Application No. 08163224.2.
Response to Communication pursuant to Art 94(3) EPC dated Jun. 10, 2011, European Patent Application No. 08163224.2.
Decision to Grant a European patent pursuant to Article 97(1) EPC dated Aug. 30, 2012, European Patent Application No. 08163224.2.

\* cited by examiner

SYSTEM, METHOD AND SECURITY DEVICE FOR AUTHORIZING USE OF A SOFTWARE TOOL

TECHNICAL FIELD

The described embodiments relate to systems, methods and security devices for authorizing use of a software tool. In particular, some described embodiments use a device (e.g. a mobile device) as the security device. Further, in some embodiments, the security device is used for authorizing use of the software tool by an untrusted device in relation to a target device.

BACKGROUND

Use of proprietary software on an untrusted computing device may lead to unauthorized copying or manipulation of the proprietary software. Some makers of proprietary software encrypt the software so that when it is stored on an untrusted computing device, the software can only be decrypted if the computing device has access to a trusted security device that has a suitable decryption key or code. The decrypted proprietary software can then be used by the untrusted computing device. In such cases, the security device that enables decryption and use of the proprietary software is sometimes referred to as a "dongle".

Thus, when the proprietary software is executed, it uses the dongle to decrypt itself. At various points in the execution of the proprietary software, the software may double-check that the dongle remains coupled to the computing device executing the software. Use of a dongle in this manner has some drawbacks, however. For example, if the computing device on which the proprietary software executes is compromised, it is possible that an unauthorized entity may be able to retrieve the unencrypted image of the proprietary software from the memory of the computing device. Further, it may be possible to fool the software into falsely recognizing the presence of the dongle by changing some instructions in the executable binary code used to check the presence of the dongle.

It is desirable to address or ameliorate one or more drawbacks, disadvantages or shortcomings associated with existing authorization methods and/or security devices, such as dongles, or to at least provide a useful alternative thereto.

BRIEF DESCRIPTION OF THE DRAWINGS

Embodiments are described in further detail below, by way of example only, with reference to the accompanying drawings, in which.

DETAILED DESCRIPTION

Figure 1:
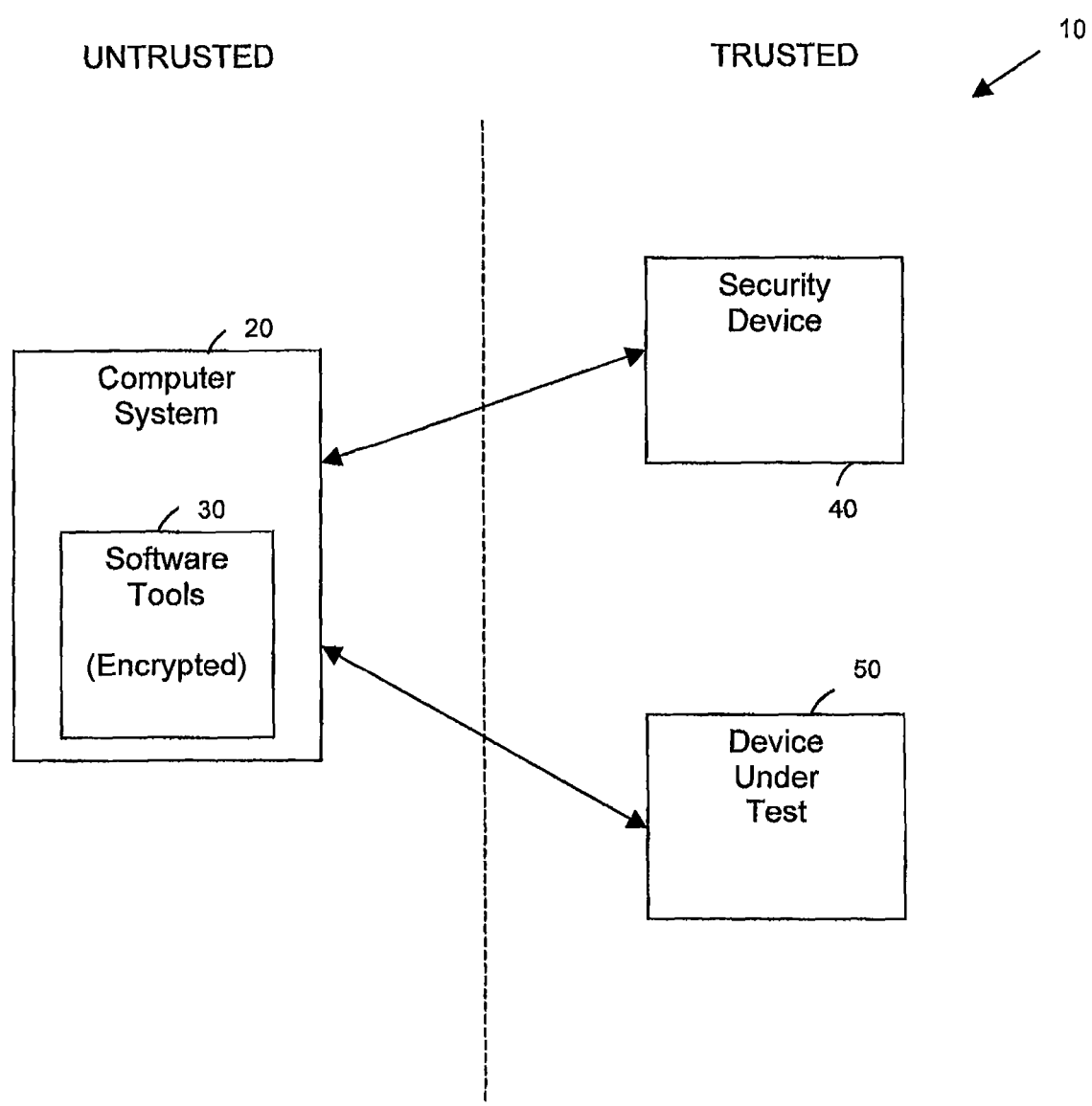
FIG. 1 is a schematic block diagram of a system that employs a security device to authorize use of a software tool in relation to a target device, such as a device under test (DUT)

The described embodiments relate generally to methods, systems and security devices for authorizing use of a software tool.

Certain embodiments described herein relate to a security device. The security device may comprise at least one communication subsystem for enabling communication between the security device and a first external device, wherein the first external device has a software tool executable on the first external device. The security device may further comprise a memory and processor coupled to the at least one communication subsystem and configured to control the at least one communication subsystem. The memory is accessible to the processor and stores a key for authorizing use of the software tool. The memory further stores program instructions which, when executed by the processor, cause the processor to execute a security application.

The security application is configured to process an encrypted request received from the first external device to use the software tool and to generate a signed response to the encrypted request. The signed response is signed using the key and comprises authorization information to enable the first external device to prove authorization to a second external device for use of the software tool by the first external device in relation to the second external device.

The security application may be configured to determine the software tool from among a plurality of possible software tools based on the encrypted request and to determine the key from among a plurality of keys stored in the memory based on the determined software tool.

The authorization information may comprise one or more restrictions regarding use of the software tool. The security application may be further configured to determine a validity of the encrypted request and to only generate the signed response if the encrypted request is determined to be valid. The encrypted request may comprise a session key and the signed response may comprise the session key in an encrypted form. The encrypted request may be decryptable by the processor using the key.

The security application may further comprise a position location subsystem for locating a geographical position of the security device. The security application may be further configured to use the position location subsystem to determine a location of the device and to compare the location to one or more permissible geographical areas stored in the memory and to determine that the encrypted request is invalid if the location is outside of the one or more permissible geographical areas.

The security device may comprise a mobile device capable of communicating over at least one wireless area network.

Other embodiments relate to a system for authorizing use of a software tool. The system comprises: a security device, a computer system and a target device.

The security device may comprise a processor, at least one communication subsystem responsive to the processor and a first memory accessible to the processor. The first memory stores a key for authorizing use of the software tool and storing program instructions which, when executed by the processor, cause the processor to execute a security application.

The computer system may comprise a second memory storing the software tool. The computer system is capable of communication with the security device via the at least one communication subsystem. The target device is in communication with the computing device.

The computer system is configured to transmit an encrypted request to the security device to use the software tool, and the processor is configured to execute the security application to generate a signed response in response to the encrypted request and send the signed response to the computing device. The signed response is signed using the key and comprises authorization information to enable the computing device to prove authorization to the target device for use of the software tool in relation to the target device.

The security application may be further configured to determine the software tool from among a plurality of possible software tools based on the encrypted request and to determine the key from among a plurality of keys stored in the memory based on the determined software tool. The security application may be further configured to determine a validity of the encrypted request and to only generate the signed response if the encrypted request is determined to be valid. The authorization information may comprise one or more restrictions regarding use of the software tool. The encrypted request may comprise a session key and the signed response may comprise the session key in an encrypted form. The encrypted request may be decryptable by the processor using the key.

The session key included in the signed response expires when the current session ends. The encrypted request may contain a request for a session key which will not expire until the user ends the session, an auto-renewable session key which will expire in, for example, a set number of hours, or a session key which expires at a set time (e.g. midnight that day). An auto-renewable session key may be extended based on additional session extension requests sent from the computer system to the security device. If the time to extend the session has passed and the user has not used the software tool for a certain period of time (for example 30 minutes) the software tool may automatically close.

The length of the session may also be based on a periodic signal, sometimes called a heartbeat signal, exchanged between the computer system and the security device. Such a heartbeat signal could be exchanged between the computer system and the security device via short-range wireless communication such as Bluetooth or NFC (Near Field Communication) or via a physical connection such as a USB cable or a message-based communication. If the computer system is unable to receive the heartbeat signals for more than a predetermined length of time, it could end the session or put the session on hold until it receives user confirmation of needed action. For example, the computer system may display a dialog box to the user indicating that the computer system has lost the heartbeat signal. The user may then re-establish the heartbeat or save data before the session is ended. A distance-oriented heartbeat signal (such as an NFC or Bluetooth signal) could be lost if, for example, the security device were to move a certain distance away from the computer system such that the security device was out of range of the communicating technology between the computer system and the security device.

A periodic signal may also be exchanged between the security device and the computing system in order to validate timing and to ensure that a user cannot tamper with the time-keeping mechanism in an attempt to keep the current session active.

The security application may be further configured to determine a validity of the encrypted request and to only generate the signed response if the encrypted request is determined to be valid. The security device may comprise a position location subsystem for locating a geographical position of the security device. The security application may be further configured to use the position location subsystem to determine a location of the device and to compare the location to one or more permissible geographical areas stored in the memory and to determine that the encrypted request is invalid if the location is outside of the one or more permissible geographical areas.

The position location subsystem may comprise a physical subsystem, such as a global positioning system (GPS), which provides accurate geographical positioning, or an interpreted subsystem which may find the location based on, for example, cellular radio parameters seen by the security device. These parameters may include the MNC (Mobile Network Code) transmitted by a mobile operator with which the security device is able to communicate or a list of base stations with which a radio, included in the security device, is able to communicate. Many service providers are able to identify the geographical locations of operator base stations around the world and approximately locate a device such as the security device described herein by deciphering the radio measurement data sent in by the device to the service provider. Alternatively, location information may be provided as an operator service, with technologies such as triangulation from multiple cell towers or other technologies used for E911 location establishment.

The security device may comprise a mobile device capable of communicating over at least one wireless area network.

Other embodiments relate to a method for authorizing use of a software tool. The method may comprise: receiving at a security device an encrypted request to use the software tool, the encrypted request being received from a first external device; generating a signed response in response to the encrypted request, the signed response being signed using a key stored in the security device and comprising authorization information to enable the first external device to prove authorization to a second external device for use of the software tool by the first external device in relation to the second external device; and transmitting the signed response to the first external device.

The method may further comprise: determining the software tool from among a plurality of possible software tools based on the encrypted request; and determining the key from among a plurality of keys stored in the memory based on the determined software tool.

The method may further comprise determining a validity of the encrypted request and generating the signed response only if the encrypted request is determined to be valid. The method may further comprise: determining a location of the security device using a position location subsystem of the security device; comparing the location to one or more permissible geographical areas stored in the security device; and determining that the encrypted request is invalid if the location is outside of the one or more permissible geographical areas.

The authorization information may comprise one or more restrictions regarding use of the software tool. The encrypted request may comprise a session key, and the signed response may comprise the session key in an encrypted form. The generation of a signed response may comprise decrypting the encrypted request using the key.

Other embodiments relate to a method performed in a system comprising a computer system, a security device and a target device, wherein the security device and the target device are each in communication with the computer system. The method is for authorizing use of a software tool stored in the computer system and may comprise: transmitting from the computer system to the target device an authorization request to use the software tool; generating at the target device a session key in response to the authorization request; encrypting the session key with a public key associated with the software tool; transmitting an encrypted request comprising the encrypted session key to the computer system from the target device; transmitting the encrypted request to the security device from the computer system; generating at the security device a signed response in response to the encrypted request, the signed response being signed using a private key stored in the security device, the private key being associated with the software tool, wherein the signed response comprises authorization information to enable the computer system to prove authorization to the target device for use of the software tool by the computer system in relation to the target device; and transmitting the signed response from the security device to the computer system.

The authorization information may comprise one or more restrictions regarding use of the software tool and the session key in a decrypted form. The method may further comprise generating at the computer system a tool use request comprising the signed response and transmitting the tool use request to the target device.

The method may further comprise determining at the target device whether to allow use of the software tool based on the tool use request. The tool use request may comprise an open channel request for establishing secure communication between the target device and the computer system, wherein the open channel request comprises the decrypted session key.

The described embodiments are employed generally in the context of a system, such as system 10 shown in FIG. 1, which employs a security device 40 to authorize use of a software tool 30 in relation to a target device, such as a device under test (DUT) 50. As shown in FIG. 1, one or more software tools 30 are stored in a computer system 20 (or other computing device) that is untrusted, meaning that the computer system 20 is not considered to be a secure computing environment. Because computer system 20 is untrusted, the one or more software tools 30 are stored on computer system 20 in such a way that computer system 20 may not use the software tools 30 without authorization. For example, in the described embodiments, one or more software tools 30 may be stored on computer system 20 in an encrypted form.

In contrast to untrusted computer system 20, security device 40 and DUT 50 are both trusted devices. In the depiction of system 10 shown in FIG. 1, where it is desired to use one of the software tools 30 in relation to DUT 50, computer system 20 must have some means of decrypting the software tool 30 that is desired to be used if the software tool 30 is stored in an encrypted form, and must be able to prove authorization of its use of the software tool 30 to DUT 50. This means that computer system 20 must be able to provide DUT 50 with some kind of signed or otherwise verifiable authorization that proves it has permission to use the software tool in relation to the DUT 50.

In system 10, DUT 50 is communicably coupled to computer system 20, and computer system 20 is communicably coupled to security device 40. "Communicably coupled" as used herein is meant to describe any kind of coupling, for example physical, electrical, logical, signal, and/or wireless coupling, or a combination thereof, sufficient to enable communication of signals, data, instructions and/or other meaningful exchange between the coupled components. Such coupling may be direct or indirect.

An example of when a system such as system 10 may be implemented is where the software tools 30 are sensitive proprietary software applications such as those that may be used during development and manufacturing of devices such as the DUT 50, where the actual manufacturing and testing of DUT 50 may be performed in locations or by entities where there is some risk of piracy or otherwise damaging access to, or use of, the proprietary development and testing software (i.e., software tools 30). Thus, in order to ensure that software tools 30 and DUT 50 do not become compromised through use of untrusted computer system 20, trusted security device 40 is used by computer system 20 to provide suitable authorization for use of one or more of software tools 30 in relation to DUT 50.

The term DUT is used herein as one example of a target device, by which is meant a device in relation to which a software tool 30 is sought to be used. Thus, the term DUT should be understood in this context as including devices that may not necessarily require testing, but which may otherwise be the object of performance of some function of a software tool 30 stored in, or otherwise accessible to, computer system 20.

The security device 40 may comprise a mobile device, such as a laptop computer or a handheld personal computing device, or a non-mobile device, such as a server or a desktop personal computer. In one example, the security device 40 may be a personal computing device, such as a mobile device 100, that communicates with other devices. An example of the structure of the mobile device 100 and how it communicates with other devices is described below, with reference to FIGS. 2 and 3. The functions and features of security device 40 are described in further detail below, with reference to FIGS. 4 and 5.

Figure 2:
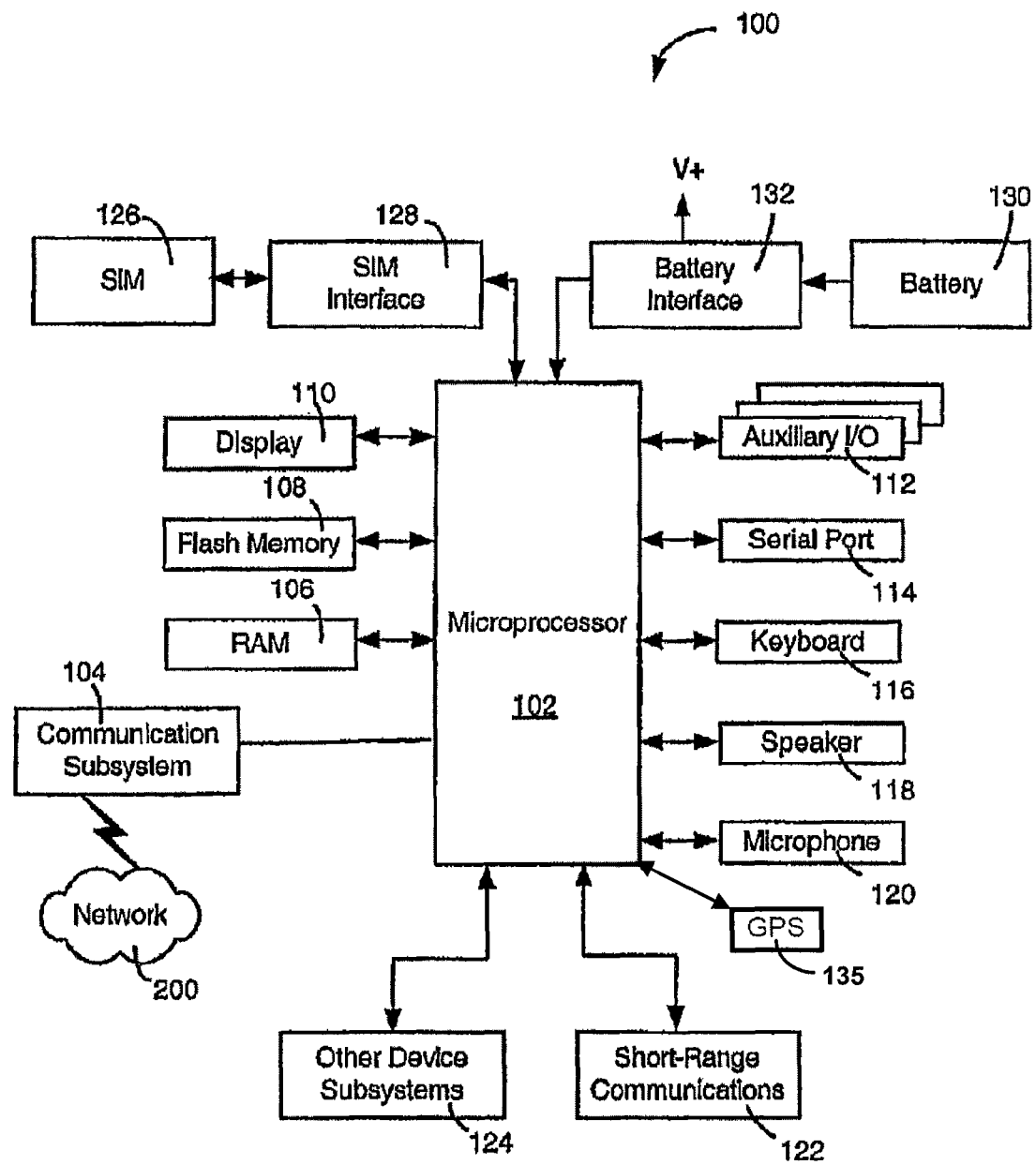
FIG. 2 is a block diagram of a mobile device as one example of the security device.

Referring now to FIG. 2, a block diagram of a mobile device in one example implementation is shown generally as 100. Mobile device 100 comprises a number of components, the controlling component typically being microprocessor 102. Microprocessor 102 controls the overall operation of mobile device 100. In some embodiments, certain communication functions, including data and voice communications, are performed through communication subsystem 104. Communication subsystem 104 may receive messages from and send messages to a wireless network 200.

In one example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE), Universal Mobile Telecommunications Service (UMTS), and Ultra Mobile Broadband (UMB), etc.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems, for example, such as a Random Access Memory (RAM) 106, flash (or other non-volatile) memory 108, display 110, auxiliary input/output (I/O) subsystem 112, serial port 114, keyboard 116, speaker 118, microphone 120, short-range communications subsystem 122 and other subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions, such as a calculator, media player or task list. Operating system software used by microprocessor 102 is typically stored in a persistent store such as flash memory 108, which may alternatively be a read-only memory (ROM) or similar storage element (not shown). The operating system, specific device applications, or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module ("SIM") or Universal Subscriber Identity Module ("USIM") or Removable User Identity Module ("RUIM") or other equivalent card 126 to be inserted in a SIM interface 128 in order to communicate with a network. SIM 126 may be one type of a conventional "smart card" used to identify a subscriber of mobile device 100 and to personalize the mobile device 100, among other things. In these example embodiments, without SIM 126, mobile device 100 may not be fully operational for communication with network 200. In other embodiments, a SIM 126 and SIM interface 128 are not provided.

By inserting SIM 126 into SIM interface 128, a subscriber may access all subscribed services. Services may include without limitation: web browsing media transfers, such as music and/or image and/or video downloading or streaming, and messaging, such as e-mail, voice mail, Short Message Service (SMS), instant messaging (IM), product identification number (PIN) messaging, and Multimedia Messaging Services (MMS). More advanced services may include without limitation: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information. In certain embodiments, SIM 126 may comprise a different type of user identifier and may be integral to mobile device 100 or not present at all.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture.

Additional applications, such as security application 310 (described below), may also be loaded onto mobile device 100, for example, through network 200, auxiliary I/O subsystem 112, serial port 114, short-range communications subsystem 122, or any other suitable subsystem 124.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, Near Field Communications (NFC), and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112.

Auxiliary I/O subsystem 112 may include one or more devices such as: a touch screen; mouse; infrared fingerprint detector; and a navigation component. The navigation component may have a dynamic button-pressing capability and may comprise a roller wheel, track ball, joystick and/or directional pad. Keyboard 116 may comprise an alphanumeric keyboard and/or telephone-type keypad. A composed item may be transmitted over network 200 through communication subsystem 104. User input components comprised in auxiliary I/O subsystem 112 may be used by the user to navigate and interact with a user interface of mobile device 100.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

GPS subsystem 135 may provide the global location of mobile device 100 at any given time.

Figure 3:
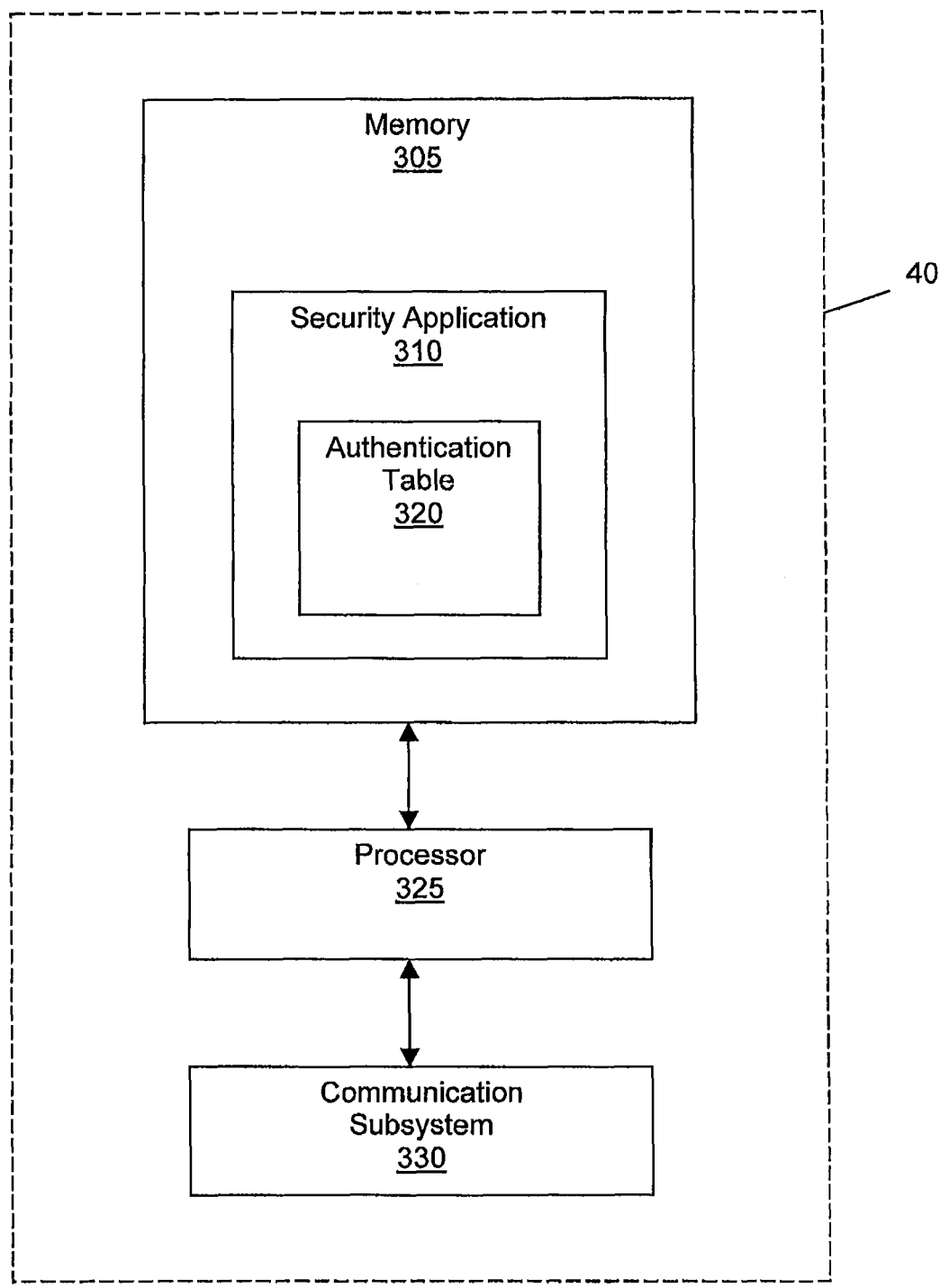
FIG. 3 is a block diagram showing an example of the security device in further detail.

Referring now to FIG. 3, a block diagram of an example of security device 40 is shown. It should be noted that mobile device 100 is only one example of security device 40, and that other embodiments of security device 40 may be employed, such as those not equipped for telephony or having fewer user interface functions and/or components than those of mobile device 100. On the other hand, security device 40 may comprise the features and components of mobile device 100, plus additional features and/or components beyond those described in relation to mobile device 100.

Security device 40 comprises a processor 325, which may comprise microprocessor 102, a memory 305, such as RAM 106 and/or flash memory 108, and communication subsystem 330. In some embodiments, a position location subsystem (such as the GPS subsystem 135 described above in relation to FIG. 2) may be communicably coupled to processor 325 to enable the security device 40 to determine the geographical location of its position. The position location subsystem may comprise part of the communication subsystem 330 or may comprise a distinct component of security device 40. The position location subsystem may also comprise a separate component that communicates with security device 40 via, for example, short-range wireless technology. For example, security device 40 may get its location information from a separate GPS puck over a Bluetooth connection between the GPS puck and security device 40.

Processor 325 may comprise any suitable processor for performing the functions of security device 40 described herein. In particular, processor 325 may comprise microprocessor 102 and/or another suitable processor configured to access memory 305 to execute program code stored therein and to interface with communication subsystem 330. Processor 325 may comprise more than one processor.

Communication subsystem 330 is communicably coupled to processor 325 and may comprise any devices, components and/or program code suitable for enabling security device 40 to communicate with an external device or system, such as computer system 20. For example, communication subsystem 330 may comprise one or more of: a serial port, such as serial port 114, which may comprise a universal serial bus (USB) port; a short range communications subsystem, such as short range communication subsystem 122; a wireless communication subsystem, such as communication subsystem 104; or any other wireless and/or wired connection and/or coupling, whether indirect or direct, that enables suitable communication between security device 40, as a trusted device, and an untrusted external device.

Memory 305 may comprise a combination of volatile and non-volatile memory. Memory 305 comprises stored program code accessible to, and executable by, processor 325 to perform various functions of security device 40. Memory 305 may comprise a security application 310, which may be stored as a module of program code within memory 305. Security application 310, when executed by processor 325, is configured to perform the functions described herein in further detail in relation to the authorization process illustrated in FIG. 5. Memory 305 also stores an authentication table 320 accessible to security application 310. Authentication table 320 is described in further detail below, with reference to FIG. 4.

Security application 310 may be configured to generally govern authorization procedures executed by security device 40 in response to an encrypted request for authorization received from computer system 20. Thus, security application 310 may perform necessary authorization, encryption and/or decryption processes, including generation of a signed request, as described below in relation to FIG. 5, and is responsible for controlling communication between security device 40 and external devices, as necessary. Security application 310 is also responsible for determining whether certain conditions and/or restrictions regarding use of a software tool 30 are met by the proposed circumstances under which the computer system 20 requests to use that software tool 30.

Figure 4:
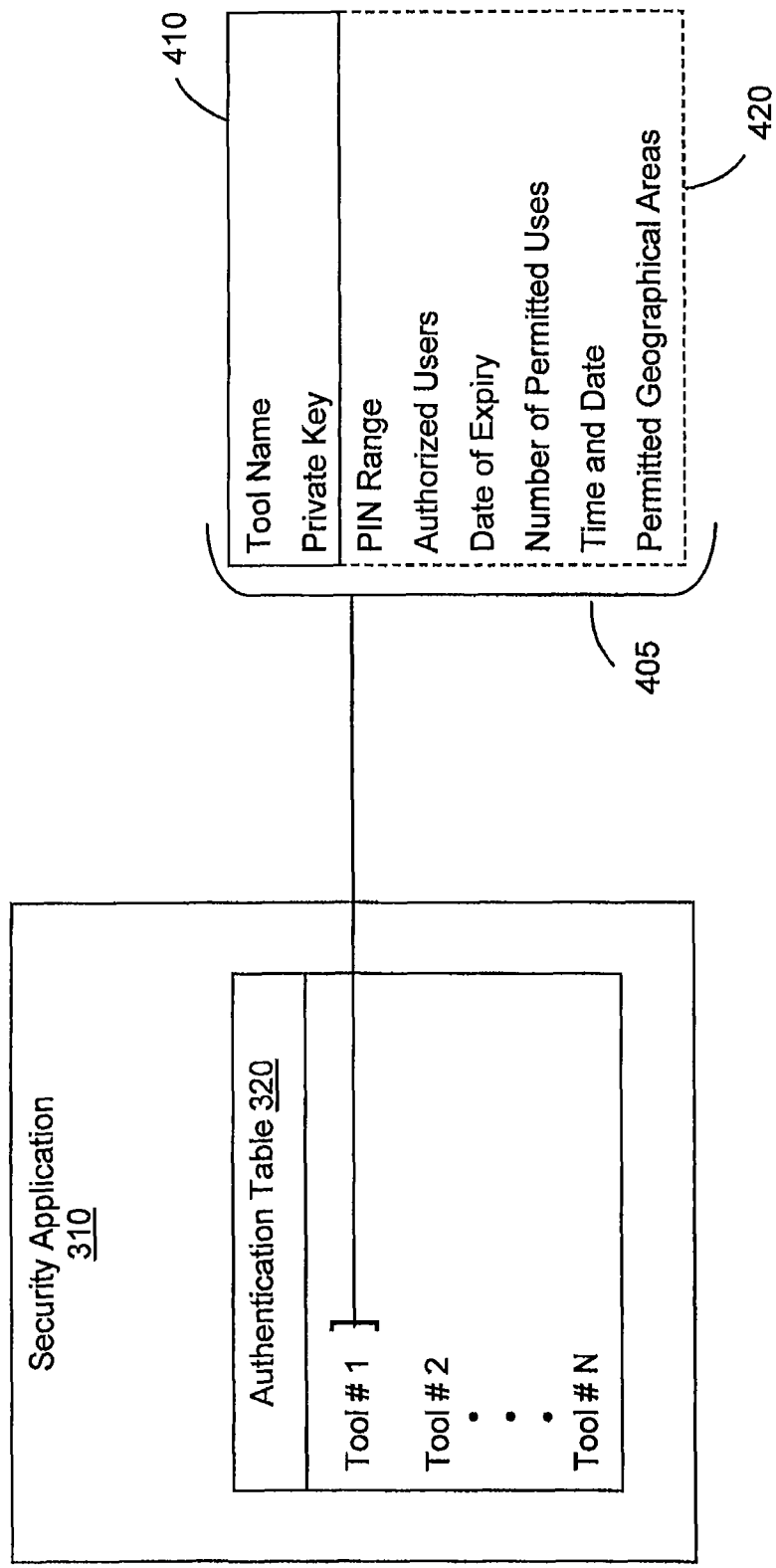
FIG. 4 is a schematic diagram of an authentication table of the security device.

Referring now to FIG. 4, a schematic diagram is shown, illustrating authentication table 320 in further detail. Authentication table 320 comprises a plurality of tool authorization files 405, corresponding to software tools for which security device 40 is configured to authorize use. Each tool authorization file 405 stored in authorization table 320 comprises tool identification information 410 and may optionally comprise conditions/restrictions 420.

Tool identification information 410 comprises a tool name, which may be a descriptive name, an assigned name or a code by which the software tool 30 can be identified. Tool identification information 410 also comprises a private key for the software tool 30 that corresponds to the tool name. Tool identification information 410 comprises the essential information of each tool authorization file 405 in authentication table 320.

In addition to the tool identification information 410, each tool authorization file 405 may comprise one or more optional conditions/restrictions 420. The optional conditions/restrictions 420 may be used to limit the use of the relevant software tool 30 according to various parameters. The optional conditions/restrictions 420 may comprise, for example, any of the following: a product identification number (PIN) range; identification information of authorized users; a predetermined date of expiry of permission to use the tool; predetermined number of permitted uses of the tool; certain times and/or dates relative to which the tool may or may not be permitted to be used; and definitions of one or more geographical areas in which use of the tool is permitted.

The PIN range may specify a number range, for example corresponding to a serial number or other type of identification number range associated with the target device to limit the number or batch of target devices in relation to which the tool can be used. The permitted geographical areas may be defined in terms of GPS coordinate ranges and may correspond, for example, to geopolitical boundaries, such as national, regional or other boundaries.

For each tool for which a tool authorization file 405 is contained in authentication table 320, there may be one or more of the optional conditions/restrictions 420 contained in the tool authorization file 405. Optional conditions/restrictions 420 other than those described above may be employed as appropriate for limiting use of the relevant software tool 30 to only those circumstances permitted or authorized by the makers or owners of the proprietary software comprised in the software tool 30.

Figure 5:
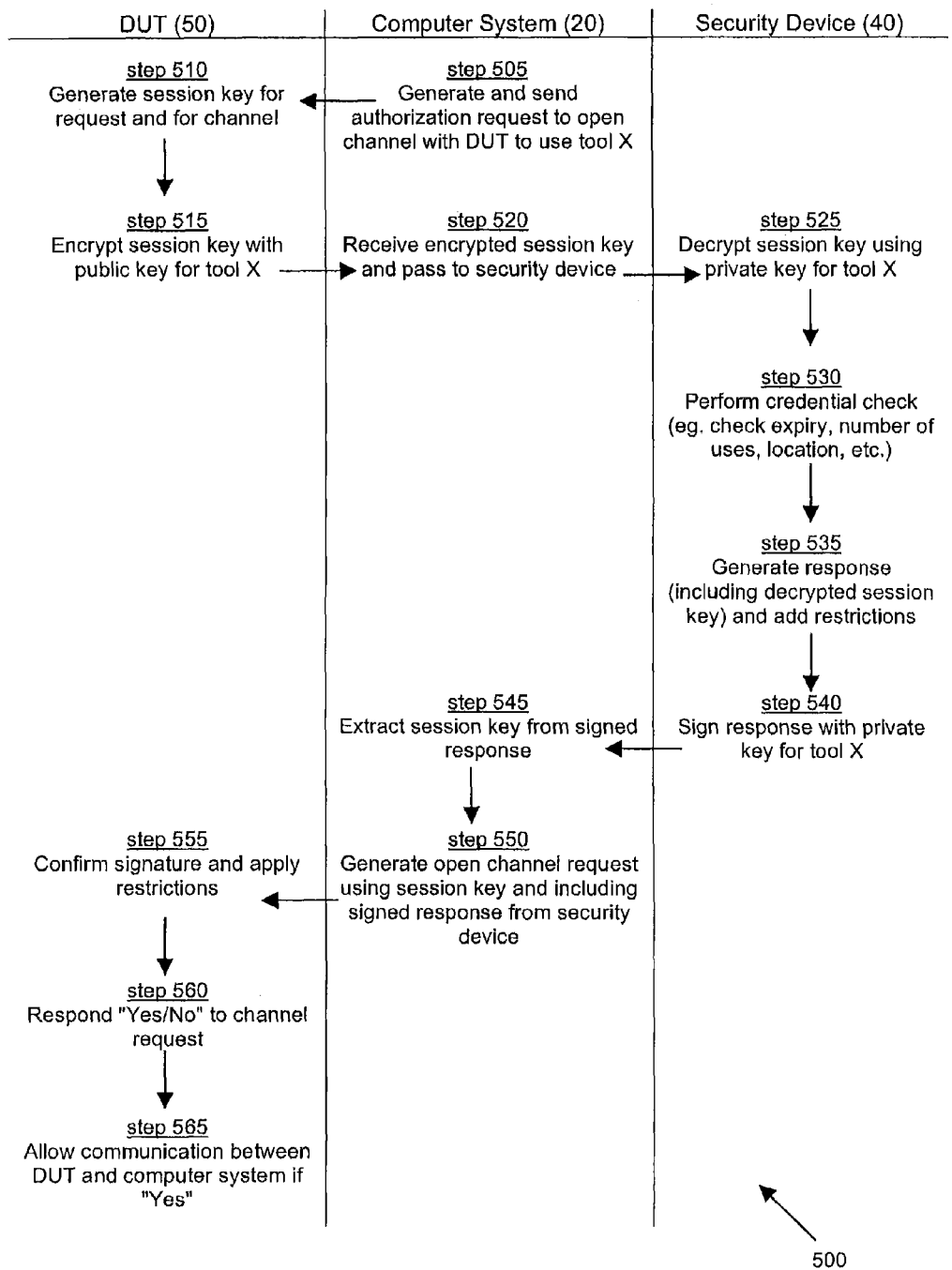
FIG. 5 is a flowchart of an authorization method.

Referring now to FIG. 5, there is shown a flowchart of an authorization method 500. In this example, some of the steps of method 500 are performed by computer system 20, while some steps are performed by DUT 50, and still others are performed by security device 40. Method 500 assumes that computer system 20 is commanded to execute a particular software tool 30, which for convenience will be referred to as "tool X". Tool X is recognized by computer system 20 as requiring authorization for use in relation to DUT 50. Accordingly, at step 505, computer system 20 generates an authorization request to open a secure communication channel with DUT 50 to use tool X. As part of step 505, computer system 20 sends the generated authorization request to DUT 50.

At step 510, in response to the received authorization request, DUT 50 generates a session key for the request and for a specific communication channel. At step 515, DUT 50 then encrypts the session key with a public key for tool X and generates an encrypted request for authorization. The encrypted request comprises the encrypted session key as well as information to enable security device 40 to identify DUT 50. Steps 510 and 515 assume that DUT 50 recognizes the tool specified in the authorization request and that a public key for that tool is stored in, or otherwise accessible to, DUT 50.

At step 520, DUT 50 sends the encrypted request to computer system 20, where it is received and then transmitted to security device 40. Computer system 20 passes the encrypted request onto security device 40 because computer system 20 does not store, or otherwise have access to, the private key for tool X that is necessary to decrypt the session key and thereby allow secure communication on the specified channel between computer system 20 and DUT 50.

At step 525, the received encrypted request, comprising the encrypted session key, is processed and the session key is decrypted using the private key for tool X contained in the tool identification information 410 of the relevant tool authorization file 405 in authentication table 320. The request comprises information to enable security device 40 to identify the particular tool that is the subject of the original authorization request sent by computer system 20 to DUT 50. As part of step 525, security device 40 compares the identified tool X to the tool identification information 410 in the stored tool authorization files 405 to determine that tool X is a tool for which security device 40 is able to authorize use. If tool X is not recognized by security device 40, a reply to that effect is provided to computer system 20.

Once the session key is decrypted at step 525, security device 40 performs a credential check to compare certain parameters, circumstances or conditions under which the authorization request is made (or the software tool is proposed to be used) by computer system 20 against the optional conditions/restrictions 420 specified in the relevant tool authorization file 405 for tool X. This may include, for example, checking an expiry date of the tool, the number of permitted uses (and whether that number has been met), the geographical area of the security device 40 and/or limitations associated with the PIN range, authorized users or time and date. Checking the geographical area may comprise using the position location subsystem to determine the location of security device 40 and determining whether the location is within the authorized geographical area.

Following the credential check at step 530, security device 40 generates a response to the encrypted request received at step 535. The response includes the decrypted session key as well as the results of the credential check based on the information concerning conditions and/or restrictions 420 stored in the tool authorization file 405 for tool X. At step 540, the response is signed using the private key for tool X and the signed response is then transmitted from security device 40 to computer system 20.

At step 545, computer system 20 extracts the decrypted session key from the signed response received from security device 40. Computer system 20 then generates an open channel request at step 550 using the decrypted session key. The open channel request includes the signed response from security device 40. As part of step 550, the open channel request is transmitted from computer system 20 to DUT 50.

At step 555, DUT 50 receives the open channel request, including the signed response. DUT 50 processes the signed response to confirm that it was signed with the private key for tool X. DUT 50 further processes the signed response to determine which conditions/restrictions 420 apply in relation to the use of tool X.

If any of the conditions/restrictions 420 prohibit the use of tool X in relation to DUT 50, as determined by the results of the credential check performed by security device 40, then at step 560 DUT 50 returns a response to computer system 20 denying the open channel request. Otherwise, step 560 comprises responding to the computer system 20 that the open channel request has been granted. If the open channel request is granted at step 560, then at step 565, DUT 50 allows communication with computer system 20 over the specified channel and allows use of tool X in relation to DUT 50.

As the session key provided by DUT may expire after a pre-determined period of time, method 500 may need to be performed multiple times in order to continue to allow use of the relevant software tool 30 in relation to DUT 50. Thus, DUT 50 may periodically check the validity of the session key that supports secure communication with computer system 20. If DUT 50 determines that the session key has expired, it may refuse to communicate further with computer system 20 until a new authorization request is made by computer system 20 to open a new channel (step 505). DUT 50 may then repeat step 510 to generate a new session key and the remainder of method 500 can be performed as described above. Thus, in order to continue to use software tool 30 in relation to DUT 50, security device 40 must remain communicably coupled to computer system 20.

Although reference is made herein to use of a public/private key pair for authorizing use of a software tool 30, other forms of encryption and/or authorization may be employed if considered suitably secure.

In some embodiments, DUT 50 may comprise a security device 40, for example where software tool 30 is for configuring security device 40 in relation to its authorization functions. In such embodiments where DUT 50 comprises security device 40, computer system 20 may communicate with an external system, such as a secure server system, in order to perform the configuration and/or provisioning of the security device 40 as the target device.

While the above description describes the example embodiments in some detail, it will be appreciated that some features and/or functions of the described embodiments are susceptible to modification without departing from the spirit and principles of operation of the described embodiments. Accordingly, what has been described above is intended to be illustrative of the disclosure and non-limiting.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention claimed is:

1. A system for authorizing use of a software tool, the system comprising:
   a security device comprising:
      a processor,
      at least one communication subsystem responsive to the processor, and
      a first memory accessible to the processor, the first memory storing a private key for authorizing use of the software tool and storing program instructions which, when executed by the processor, cause the processor to execute a security application;
a computing device comprising:
a second memory storing the software tool, the computing device being capable of communication with the security device via the at least one communication subsystem; and
a target device in communication with the computing device, wherein the target device is configured to generate a session value that is transmittable to the computing device;
wherein the computing device is configured to:
transmit, to the target device, an authorization request to use the software tool in relation to the target device,
receive, from the target device, an encrypted request comprising the session value that is generated at the target device, and
in response to the receiving of the encrypted request, transmit, to the security device, the received encrypted request to use the software tool, and
wherein the security device is configured to:
execute the security application to generate a signed response in response to the encrypted request, and
send the signed response to the computing device, the signed response being:
signed using the private key and
comprising the session value in a decrypted form and authorization information to enable the computing device to prove authorization to the target device for use of the software tool in relation to the target device.

2. The system of claim 1, wherein the authorization information comprises one or more restrictions regarding use of the software tool.

3. The system of claim 1, wherein the encrypted request is decryptable by the processor using the private key.

4. The system of claim 1, wherein the security application is further configured to determine the software tool from among a plurality of possible software tools based on the encrypted request and to determine the private key from among a plurality of keys stored in the memory based on the determined software tool.

5. The system of claim 1, wherein the security application is further configured to determine a validity of the encrypted request and to only generate the signed response if the encrypted request is determined to be valid.

6. The system of claim 5, wherein the security device comprises a position location subsystem for locating a geographical position of the security device.

7. The system of claim 6, wherein the security application is further configured to use the position location subsystem to determine a location of the security device and wherein the security application is further configured to compare the location to one or more permissible geographical areas stored in the first memory and to determine that the encrypted request is invalid if the location is outside of the one or more permissible geographical areas.

8. The system of claim 1, wherein the security device comprises a mobile device capable of communicating over at least one wireless area network.

9. In a system comprising a computer system, a security device and a target device, wherein the security device and the target device are each in communication with the computer system, a method of authorizing use of a software tool stored in the computer system, the method comprising:
transmitting from the computer system to the target device an authorization request to use the software tool;
generating at the target device a session value in response to the authorization request;
encrypting the session value with a public key associated with the software tool;
transmitting, from the target device to the computer system, an encrypted request comprising the encrypted session value generated at the target device;
receiving, at the computer system, the encrypted request;
in response to the receiving of the encrypted request at the computer system, transmitting the received encrypted request to the security device from the computer system;
generating at the security device a signed response in response to the encrypted request, the signed response being signed using a private key stored in the security device, the private key being associated with the software tool, wherein the signed response comprises the session value in decrypted form and authorization information to enable the computer system to prove authorization to the target device for use of the software tool by the computer system in relation to the target device; and
transmitting the signed response from the security device to the computer system.

10. The method of claim 9, wherein the authorization information comprises one or more restrictions regarding use of the software tool.

11. The method of claim 9, further comprising generating, at the computer system, a tool use request comprising the signed response, and transmitting the tool use request to the target device.

12. The method of claim 11, further comprising determining at the target device whether to allow use of the software tool based on the tool use request.

13. The method of claim 11, wherein the tool use request comprises an open channel request for establishing secure communication between the target device and the computer system, wherein the open channel request comprises the decrypted session value.

* * * * *